United States Patent
Kroeger et al.

(10) Patent No.: US 6,317,470 B1
(45) Date of Patent: Nov. 13, 2001

(54) ADAPTIVE WEIGHTING METHOD FOR ORTHOGONAL FREQUENCY DIVISION MULTIPLEXED SOFT SYMBOLS USING CHANNEL STATE INFORMATION ESTIMATES

(75) Inventors: Brian William Kroeger, Sykesville; Denise Maureen Cammarata, Owings Mills, both of MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/153,636

(22) Filed: Sep. 15, 1998

(51) Int. Cl.[7] ........................................... H04L 27/22

(52) U.S. Cl. ..................... 375/340; 375/332; 375/341; 714/795

(58) Field of Search .......................... 375/216, 219, 375/130, 142, 269, 272, 329, 332, 341, 262, 340, 346; 714/794, 795

(56) References Cited

U.S. PATENT DOCUMENTS

| | | | |
|---|---|---|---|
| 3,488,445 | 1/1970 | Chang | 370/203 |
| 5,142,551 | 8/1992 | Borth et al. | 375/219 |
| 5,228,025 | 7/1993 | Le Floch et al. | 370/206 |
| 5,271,042 | * 12/1993 | Borth et al. | 375/348 |
| 5,274,629 | 12/1993 | Helard et al. | 370/208 |
| 5,278,826 | 1/1994 | Murphy et al. | 370/343 |
| 5,278,844 | 1/1994 | Murphy et al. | 714/778 |
| 5,315,583 | 5/1994 | Murphy et al. | 370/312 |
| 5,465,396 | 11/1995 | Hunsinger et al. | 455/61 |
| 5,588,022 | 12/1996 | Dapper et al. | 375/216 |
| 5,633,896 | 5/1997 | Carlin et al. | 375/340 |
| 5,673,292 | 9/1997 | Carlin | 375/269 |
| 5,825,807 | * 10/1998 | Kumar | 375/130 |
| 5,838,739 | 11/1998 | Ramesh et al. | 375/348 |
| 5,850,415 | * 12/1998 | Hunsinger et al. | 375/216 |
| 5,903,614 | * 5/1999 | Suzuki et al. | 375/340 |
| 5,949,796 | 9/1999 | Kumar | 370/529 |
| 5,949,813 | * 9/1999 | Hunsinger et al. | 375/142 |
| 6,044,106 | * 3/2000 | Suzuki | 375/219 |
| 6,047,035 | * 4/2000 | Yellin | 375/346 |

FOREIGN PATENT DOCUMENTS

| | | | |
|---|---|---|---|
| 2000228657 | * 8/2000 | (JP) | H04L/11/00 |
| 9749207 | 12/1997 | (WO) . | |

OTHER PUBLICATIONS

B. Kroeger, A. Vigil, "Improved IBOC DAB Technology For AM and FN Broadcasting", Oct. 1996.

M. Alard, R. Lassale, "Principles of modulation and channel coding for digital broadcasting for mobile receivers", EBU Review, No. 224, pp. 168–190, Aug. 1987.

J. Hagenauer, "Rate–Compatible Punctured Convolutional Codes (RCPC Codes) and Their Applications," IEEE Trans. Comm., vol. 36, No. 4, pp. 389–400, Apr., 1988.

(List continued on next page.)

*Primary Examiner*—Stephen Chin
*Assistant Examiner*—Chieh M. Fan
(74) *Attorney, Agent, or Firm*—Robert P. Lenart, Esq.; Pietragallo, Bosick & Gordon

(57) ABSTRACT

A method for weighting orthogonal frequency division multiplexed soft symbols is provided, including the steps of receiving a plurality of sub-carriers modulated by digital information and filtering the sub-carriers to produce complex soft decision outputs. The magnitudes of the soft decision outputs are used to creating a first sequence of data. The differences between successive samples in the first sequence are used to create a second sequence of data. The first and second sequences are filtered and compensated for differences in effective group delay of the first and second sequences to produce third and fourth sequences. Then these third and fourth sequences are used to determine a plurality of weights and the weights are applied to the complex soft decision outputs. A receiver which incorporates the method is also disclosed.

14 Claims, 2 Drawing Sheets

OTHER PUBLICATIONS

Rappaprot, T. S., "Wireless Communications Principles and Practice", IEEE Press, 1996, p. 328.

Kroeger, B.W., Peyla, P.J., Robust IBOC DAB AM and FM Technology For Digital Audio Broadcasting, Apr. 1997.

* cited by examiner

ADAPTIVE WEIGHTING METHOD FOR ORTHOGONAL FREQUENCY DIVISION MULTIPLEXED SOFT SYMBOLS USING CHANNEL STATE INFORMATION ESTIMATES

BACKGROUND OF THE INVENTION

This invention relates to signal processing, and more particularly, to signal processing techniques for use in Digital Audio Broadcasting (DAB) systems.

Digital Audio Broadcasting is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the same spectral mask of an existing AM or FM channel allocation. IBOC promotes economy of spectrum while enabling broadcasters to supply digital quality audio to their present base of listeners. Several IBOC DAB approaches have been suggested. One such approach, set forth in U.S. Pat. No. 5,588,022, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally-modulated carrier signals are broadcast within a bandwidth which encompasses the first frequency spectrum. Each digitally-modulated carrier signal is modulated by a portion of a digital program signal. A first group of the digitally-modulated carrier signals lies within the first frequency spectrum and is modulated in quadrature with the first carrier signal. Second and third groups of the digitally-modulated carrier signals lie outside of the first frequency spectrum and are modulated both in-phase and in-quadrature with the first carrier signal. Multiple carriers are employed by means of orthogonal frequency division multiplexing (OFDM) to bear the communicated information.

FM IBOC broadcasting systems using have been the subject of several United States patents including U.S. Pat. No. 5,465,396; 5,315,583; 5,278,844 and 5,278,826. In addition, a commonly assigned pending patent application for a "Method and System for Simultaneously Broadcasting and Receiving Digital and Analog Signals, by D. Kumar and B. Hunsinger, Ser. No. 08/274,140, filed Jul. 1994 discloses an FM IBOC DAB system, now U.S. Pat. No 5,956,624.

The signals used in Digital Audio Broadcasting are subject to fading and noise (interference). Digital Audio Broadcasting receivers may include Viterbi decoders. Conventional implementations of soft-decision Viterbi decoders rely on constant signal and gaussian noise statistics for (near) optimum decoding. Practically these statistics should be nearly constant over the path memory of the Viterbi decoder, or the span of the interleaver, whichever is greater. An interleaver may be used to yield statistical independence of the fading statistics of the soft symbols over the path memory of the Viterbi decoder after deinterleaving. The remedy for a flat fading channel causing fluctuating signal levels with constant noise is well known. However, there exists a need for a signal processing technique that can address independently varying signal and noise levels.

SUMMARY OF THE INVENTION

A method for weighting orthogonal frequency division multiplexed soft symbols is provided, including the steps of receiving a plurality of sub-carriers modulated by digital information, filtering the sub-carriers to produce complex soft decision outputs, creating a first sequence of the magnitudes of the complex soft decision outputs, determining the differences between successive samples in the first sequence, creating a second sequence of the differences between successive samples in the first sequence, filtering the first and second sequences and compensating for differences in effective group delay of the first and second sequences to produce third and fourth sequences, using the third and fourth sequences to determine a plurality of weights, and applying the plurality of weights to the complex soft decision outputs. The invention also encompasses receivers that incorporate the above method.

DESCRIPTION OF THE PREFERRED EMBODIMENTS

Figure 1:
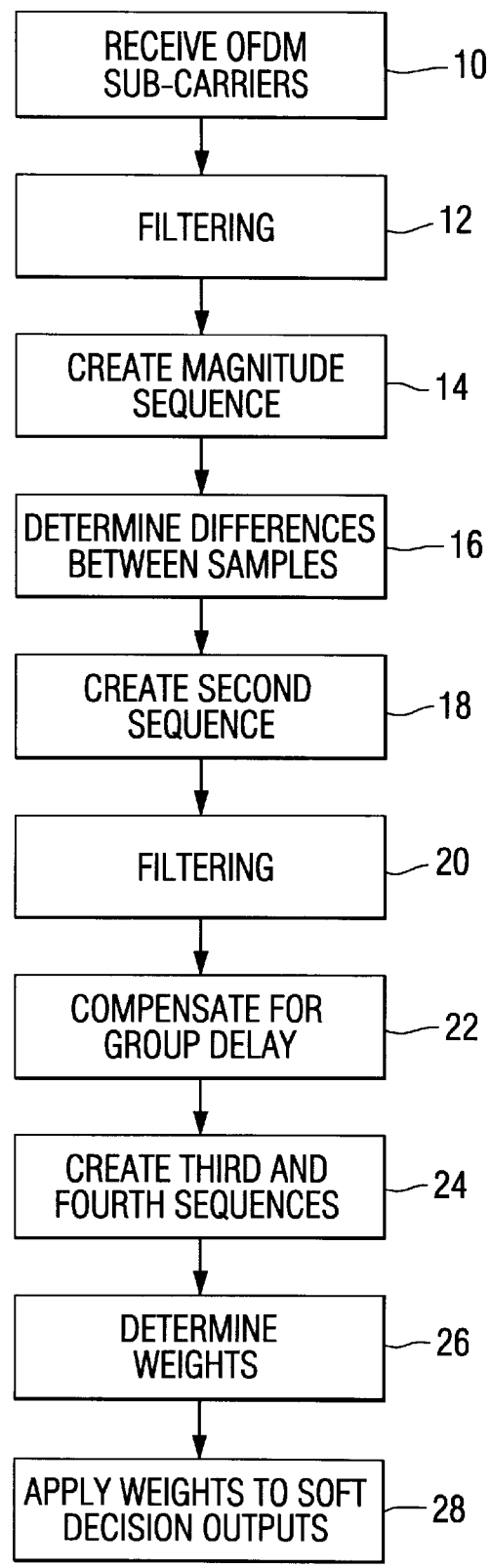
FIG. 1 is a diagram showing the steps in the method of this invention.

The present invention will be described in terms of the adaptive weighting procedure for coherently detected quadrature phase shift keyed (QPSK) or binary phase shift keyed (BPSK) signals under various fading conditions assuming gaussian noise or interference statistics.

For single carrier, flat fading signal, constant noise or interference, the flat fading channel multiplies the $K^{th}$ interleaved symbol by a fading factor $a_k$, which is assumed to be constant over the symbol duration. The signal sample output of a matched filter in the receiver can be expressed as:

$$y_k = a_k x_k + n_k \qquad (1)$$

where $x_k$ is the transmitted signal component and $n_k$ is the received noise. The appropriate weighting for that soft decision symbol at the receiver is itself $a_k$, or more practically the receiver's estimate $\hat{a}_k$. Therefore the soft symbol $S_k$ entering a deinterleaver prior to the Viterbi decoder is presented as:

$$s_k = \hat{a}_k y_k \qquad (2)$$

The symbols immediately surrounding the $k^{th}$ symbol are similarly affected by the relatively slowly varying fading. It is impossible to adequately estimate this fading factor over a single symbol because it is impossible to separate its statistics from the noise. However the fading factor can be estimated statistically using a weighted average over a set of samples with correlated fading constants, specifically the symbols that are temporally close to the $k^{th}$ symbol.

Let the signal term $x_k$ be complex whose real and imaginary components are binary valued at ±1. For reasonably large SNR, where the noise (or interference) is approximated to be zero mean average white Gaussian noise (AWGN), the fading factor might be estimated as:

$$\hat{a}_k = E\{|y_k|\} \tag{3}$$
$$= E\{|a_k \cdot x_k + n_k|\} \cong E\{a_k\}$$

However, this estimate is not accurate for small SNR since the rectified noise will place a lower limit on $\hat{a}_k$. This limitation would reduce erasure effectiveness when the signal level fades to zero. The signal level for coherent detection and Gaussian noise can be estimated using an exact expression as a function of the second and fourth moments of the magnitude of $y_k$ (i.e. $E\{|y_k|^2\}$ and $E\{|y_k|^4\}$). These moments are obtained through averaging or lowpass filtering of the squared or fourth power of the magnitude of $y_k$. Assuming a constant AWG noise floor, the weighting factor for the soft decision is equal to the fading factor:

$$\hat{a}_k = \sqrt[4]{2 \cdot (E\{|y|^2\})^2 - E\{|y|^4\}} \tag{4}$$

This equation has been used to successfully estimate the signal level in a mobile satellite receiver.

For single carrier, flat fading signal, and flat fading interference, the difference between the constant signal and the flat fading signal appears as an interference fading factor $\sigma_k$. It is assumed that the fading of the signal and interference are approximately independent, and the interference is approximated as AWGN. The Gaussian interference assumption is made in the absence of known precise statistics of the interferer. Furthermore, this assumption becomes less objectionable when we recognize that the Viterbi decoder tends to "Gaussianize" the noise or interference summed over the weighted symbols in its path memories. The soft-decision output of the matched filter can be expressed as:

$$y_k = a_k \cdot x_k + \sigma_k \cdot n_k \tag{5}$$

Dividing both sides by $\sigma_k$ puts the expression in form familiar to the nonfaded interference case:

$$\frac{y_k}{\sigma_k} = \frac{a_k}{\sigma_k} \cdot x_k + n_k \tag{6}$$

Then the appropriate weight for the soft symbol is identified. The soft symbol entering the deinterleaver prior to the Viterbi decoder is presented as:

$$s_k = \frac{\hat{a}_k}{\hat{\sigma}_k^2} \cdot y_k \tag{7}$$

The fading factor can be estimated as in equation (4). An additional estimate of the noise variance $$\hat{\sigma}_k^2$$

is required for this weighting. This estimate can be computed as:

$$\hat{\sigma}_k^2 = E\{|y_k|^2\} - \hat{a}_k^2 \tag{8}$$

For multiple sub-carriers (OFDM), selective fading signal, and selective fading interference, the method of the present invention can be described as follows. OFDM sub-carriers comprise a set of orthogonally spaced (in frequency) sub-carriers, each modulated synchronously at the symbol rate. QPSK sub-carrier modulation is assumed here, although other linear modulation techniques such as MPSK or QAM can be accommodated with modification. OFDM has been shown to be tolerant of multipath fading since the fading over any individual sub-carrier bandwidth is considered to be flat (flat fading requires no sub-carrier equalization). In a severe selective fading instance, a portion of the OFDM sub-carriers may be lost in a null while the remaining sub-carriers are recoverable. In contrast, wideband single carrier modulation can experience the same spectral null where significant degradation can occur over all the bits if equalization is not employed.

Each OFDM sub-carrier can be treated as an independent channel with flat fading signal and interference; however, this is not optimum. The correlation of the signal and noise fading across sub-carriers nearby in frequency can be exploited to improve performance. This can be accomplished through filtering the statistics across both time and frequency surrounding any particular sub-carrier. The $k^{th}$ symbol of the $nt^{th}$ sub-carrier is weighted as:

$$s_{k,n} = \frac{\hat{a}_{k,n}}{\hat{\sigma}_{k,n}^2} \cdot y_{k,n} \tag{9}$$

where $y_{k,n}$, is a complex soft symbol resulting from QPSK demodulation of the $k^{th}$ symbol of the $n^{th}$ sub-carrier. The only difference between equations (9) and (7) is the exploitation of the correlation of adjacent sub-carrier statistics in equation (9). The fading factors can be estimated after 2-dimensional smoothing (filtering across time and sub-carriers) of the following values:

$$U_{k,n} = E\{|y_{k,n}|^2\}$$
$$V_{k,n} = E\{|y_{k,n}|^4\} \tag{10}$$

Compute the symbol weighting factor for coherently detected QPSK as:

$$w_{k,n} = \frac{\sqrt[4]{2 \cdot u_{k,n}^2 - v_{k,n}}}{u_{k,n} - \sqrt{2 \cdot u_{k,n}^2 - v_{k,n}}} \tag{11}$$

where $W_{k,n}$ is the weight to be used for the soft symbol prior to deinterleaving.

The adaptive weighting procedure for differentially detected QPSK signals under various fading conditions will now be described. These results can be extended to BPSK with minor modification.

The goal of the present invention is to maximize the resulting SNR of the weighted and combined symbols after differential detection into the Viterbi decoder. This minimizes the probability of bit error at the output of the Viterbi decoder. The absolute optimization of the weighting of the soft decision statistic is a function of the particular Viterbi decoder. Therefore the answer is not necessarily unique. Furthermore, since the Viterbi decoder tends to "Gaussianize" the path metrics over the path memories, then this technique tends to maximize the SNR over the path memory.

A similar expression for the weighting factor can be derived assuming Gaussian noise into a differential QPSK detector resulting in non-Gaussian statistics at the output. The fading factor can be computed as a function of the statistics of the output of the differential detector where we define the soft decision of the form:

$$S = (a + n_1) \cdot (a \cdot e^{j\phi} + n_2) \quad (12)$$

where $\phi$ denotes the phase information imposed between a pair of adjacent symbols in the differential encoding, and n are the independent noise samples. The fading factor a of the adjacent symbols is assumed to be approximately equal. The signal to noise ratio after differential detection is easily computed to be:

$$SNR = \frac{a^4}{2 \cdot a^2 \cdot \sigma^2 + \sigma^4} \quad (13)$$

The ideal weighting factor for the post-differentially detected symbols is therefore:

$$w = \frac{a^2}{2 \cdot a^2 \cdot \sigma^2 + \sigma^4} \quad (14)$$

The first differential approach described here uses statistical estimates of the second and fourth moments of the differentially detected symbols to form the weighting factor. The second and fourth moments are described by the following previously known relationships.

$$E\{|S|^2\} = (a^2 + \sigma^2)^2$$

$$E\{|S|^4\} = (a^4 + 4 \cdot a^2 \cdot \sigma^2 + 2 \cdot \sigma^4)^2 \quad (15)$$

Then the fading factor can be estimated as:

$$\hat{a}_k = \sqrt[4]{2 \cdot E\{|S_k|^2\} - \sqrt{E\{|S_k|^4\}}} \quad (16)$$

and the noise can be estimated as:

$$\hat{\sigma}_k^2 = \sqrt{E\{|S_k|^2\}} - \hat{a}_k^2 \quad (17)$$

The estimates of equations (16) and (17) are inserted into equation (14) to obtain the weight.

Simulations were performed using adaptive weighting as described in equations (14), (16), and (17). Although long-term estimates without fading yielded good results, a compromise must be reached between long filter time constants for accurate estimation versus short filter time constants needed to track varying statistics due to fading.

In the Digital Audio Broadcasting (DAB) simulation, the OFDM symbol rate of 689.0625 Hz was chosen with a fading bandwidth of 13 Hz. Then the reciprocal of the fading bandwidth is about 53 symbols in this case. A filter time constant of 16 symbols was chosen since this time constant must be small compared to the fading time. Unfortunately, the statistical estimation errors over this short filter time yielded poor performance results for the adaptive weighting compared to what would be possible with perfect statistical estimation. Even reducing the fading bandwidth down to 3 Hz and increasing the filter time constant to 64 samples left a significant loss.

Equations (16) and (17) reveal that, in effect, quantities raised to the fourth power are subtracted to yield smaller numbers. This situation is most pronounced when the signal and noise powers are approximately equal, resulting in large estimation errors. Simulation results support this observation. Therefore another estimator is sought that does not rely upon subtraction fourth order statistics. The desired estimation technique should be designed to accommodate a fading bandwidth of up to 13 Hz for maximum vehicle speeds in the FM band around 100 MHz.

The optimum soft-symbol weight to be applied before differential detection of QPSK can be described as a function of time (k index) and OFDM sub-carrier (n index). Similar to equation (14), this weight is:

$$w_{k,n} = \frac{a_{k,n}}{\sqrt{2 a_{k,n}^2 \sigma_{k,n}^2 + \sigma_{k,n}^4}} \quad (18)$$

where $a_{k,n}$ is the fading coefficient of the $k^{th}$ symbol for the $n^{th}$ sub-carrier, and $\sigma_{k,n}$ is the corresponding standard deviation of the noise or interference, both prior to differential detection. Notice that the weight of equation (18) is the square root of equation (14). This is a result of the reasonable assumption that the weight changes slowly over the symbol-pair time used in the differential detection. In effect, the differential detection squares the predetection weight of equation (18), which would result in equation (14). A method for improving the statistical estimates of equation (18) is sought.

Practical methods for estimating CSI and weights using pre-differentially detected soft-symbols and weight also applied to the soft decision symbol prior to differential detection will now be discussed.

For moderate to high SNR, the weight of equation (18) can be conveniently approximated by:

$$\lim_{SNR \to \infty} w_k = \frac{1}{\sqrt{2\sigma_k^2}}, \quad (19)$$

where simple statistical measurements were used to estimate $\sigma^2$. However, simulation confirmed that this weight estimate performed poorly during times when the SNR was very low due to fading interference. For example, the optimum weight would have suppressed the noisy samples more than the high SNR approximation to the weight. Therefore, another approximation was sought which would estimate CSI statistics over a large SNR range. Furthermore the estimate should not be sensitive to a gaussian noise or interference assumption, and should be estimated with sufficient accuracy in a time (filter time constant) significantly less than the reciprocal of the fading bandwidth.

A simple and robust estimation technique evolved after simulation and some experimentation. This estimation technique approximates the previously-defined weight expressions, but uses lower-order statistical approximations. This technique is described in the following 4 steps.

1. Create a sequence $V_{k,n}$ for each QPSK sub-carrier consisting of the magnitudes of the complex soft decision outputs $S_{k,n}$ from the matched filter for the $n^{th}$ sub-carrier.

$$v_{k,n} = |s_{k,n}| \quad (20)$$

2. Create a sequence $d_{k,n}$ consisting of the differences of successive time samples of $V_{k,n}$.

$$d_{k,n} = v_{k,n} - v_{k-1,n} \quad (21)$$

3. Filter the sequences $V_{k,n}$ and $d_{k,n}$ using second-order digital IIR filters, then compensate for any differences in effective group delay to yield sequences $\text{filtv}_{k,n}$ and $\text{filtd}_{k,n}$. The time constant for the $\text{filtv}_{k,n}$ filter should be somewhat smaller than the reciprocal of the fading bandwidth, while the time constant for the $\text{filtd}_{k,n}$ filter can be somewhat larger. These sequences are representative (approximately proportional) of the local mean and standard deviation of the sequence $V_{k,n}$.

4. The sequence of weights for the soft decisions for each sub-carrier to be applied prior to differential detection is defined as $$w_{k,n} = \frac{1}{\text{filtd}_{k,n} \cdot \left(1 + \left(\frac{\text{filtd}_{k,n}}{\text{filtv}_{k,n} - \text{filtd}_{k,n}}\right)^4\right)} \quad (22)$$

To prevent numerical overflow, check to ensure that $\text{filtv}_{k,n} > 1.5 \cdot \text{filtd}_{k,n}$ in equation (22); otherwise, set the weight to zero. Simulation results verified that this weight yields good performance under a variety of channel impairments with fading and interference.

The values of $\text{filtd}_{k,n}$ and $\text{filtv}_{k,n}$ are estimated using filtering techniques described next. Filtering is performed first for each sub-carrier at the $k^{th}$ symbol instant in time. Then the rows of $\text{filtd}_{k,n}$ and $\text{filtv}_{k,n}$ are simply updated across the N sub-carriers. Equation (23) filters the sequences $V_{k,n}$ with a time delay of approximately 16 symbols, and equation (24) filters the sequences $d_{k,n}$ with a time delay of approximately 64 symbols. Both filters have a zero frequency gain of nearly unity.

$$\text{subv}_{k,n} = \frac{960 \cdot \text{subv}_{k-1,n} - 451 \cdot \text{subv}_{k-2,n} + 3 \cdot v_{k,n}}{512} \quad (23)$$

$$\text{subd}_{k,n} = \frac{16128 \cdot \text{subd}_{k-1,n} - 7939 \cdot \text{subd}_{k-2,n} + 3 \cdot d_{k,n}}{8192} \quad (24)$$

Additional filtering is performed across the N sub-carriers. Smoothing the estimates across the N sub-carriers requires 3 passes of a simple IIR filter. The first pass sets the appropriate initial condition of the filter, but does not update the estimates. The direction of the second pass is reversed from the first, while the third pass is reversed again. This results in an approximately symmetric (linear phase) filter characteristic which is desirable for providing the estimates on the center carrier. Although it is impossible to provide this symmetric filtering for the sub-carriers at each end of the band, the impulse response "tails" are folded back into the active sub-carriers.

The first pass across the sub-carriers sets the initial values of $\text{filtv}_{n-1}$ and $\text{filtd}_{n-1}$ without replacing the time-filtered values for each sub-carrier. The time index k is ignored here since it is understood that the filtering over the sub-carriers is performed over each $k^{th}$ OFDM symbol.

$\text{filtv}_{n-1} <= (1-\beta) \cdot \text{filtv}_{n-1} + \beta \cdot \text{subv}_n;$ $\text{filtd}_{n-1} <= (1-\beta) \cdot \text{filtd}_{n-1} + \beta \cdot \text{subd}_n;$ $n = 0, 1, \ldots N-1 \quad (25)$ The second pass smoothes the values across the filtered estimates for each sub-carrier, subv and subd.

$\text{filtv}_n <= (1-\beta) \cdot \text{filtv}_{n-1} + \beta \cdot \text{subv}_n;$ $\text{filtd}_n <= (1-\beta) \cdot \text{filtd}_{n-1} + \beta \cdot \text{subd}_n;$ $n = N-2, N-3, \ldots 0 \quad (26)$ The third pass smoothes the frequency values again to achieve a nearly symmetrical impulse response (except for the sub-carriers near the endpoints).

$\text{filtv}_n <= (1-\beta) \cdot \text{filtv}_{n-1} + \beta \cdot \text{fltv}_n;$ $\text{filtd}_n <= (1-\beta) \cdot \text{filtd}_{n-1} + \beta \cdot \text{fltd}_n;$ $n = 1, 2, \ldots N-1. \quad (27)$ The resulting filtered values for filtv and filtd computed in equations (26) and (27) are used in equation (22) at each OFDM symbol time to yield the appropriate weight for each soft symbol prior to differential detection, but after matched filtering, in the receiver.

FIG. 1 is a diagram showing the steps of the method of this invention. Block 10 shows the step of receiving a plurality of sub-carriers modulated by digital information. The sub-carriers are filtered as shown in block 12 to produce complex soft decision outputs. These outputs are used in block 14 to create a first sequence of the magnitudes of the complex soft decision outputs. Block 16 shows that the differences between successive samples in the first sequence are determined. A second sequence of the differences between successive samples in the first sequence is created as shown in block 18. The first and second sequences are filtered as in block 20 and compensated for differences in effective group delay of the first and second sequences as in block 22 to produce third and fourth sequences in block 24. The third and fourth sequences are used to determine a plurality of weights as shown in block 26, and the plurality of weights are applied to the complex soft decision outputs as shown in block 28.

The above discussion relates to differentially detected QPSK. The derivation for the weight using coherent detection of QPSK or (BPSK) would be similar to the technique discussed above for differentially detected QPSK. The only modification should be in the expression presented in equation (22). It can be predicted that the weight should be of the form:

$$w_{k,n} = \frac{\text{filtv}_{k,n} - c \cdot \text{filtd}_{k,n}}{\text{filtd}_{k,n}^2} \quad (27)$$

where c is a constant to be defined by empirical methods.

Techniques for estimating the optimum soft-decision weight for QPSK symbols prior to Viterbi decoding were described. These techniques apply to coherent and differential detection of single or multi-carrier (OFDM) QPSK, with and without multipath fading of the signal of interest or the interferer. The fading cases can necessitate a compromise between accurate CSI estimation and agility of the CSI to track the fading signal or noise components.

The application of soft-decision weighting for an OFDM system with independently faded signal and noise (interference) can improve BER performance. This weight is applied to the soft symbols prior to deinterleaving and Viterbi decoding. The optimal weight for each soft symbol over time and sub-carriers is estimated through an expression using filtered statistical estimates of channel state information (CSI) about the signal and noise components of the received symbols. The above CSI estimation and weighting techniques can apply to both coherent and differentially detected symbols, and to single and multi-carrier (OFDM) modulation in the presence of multipath fading and colored noise statistics.

Figure 2:
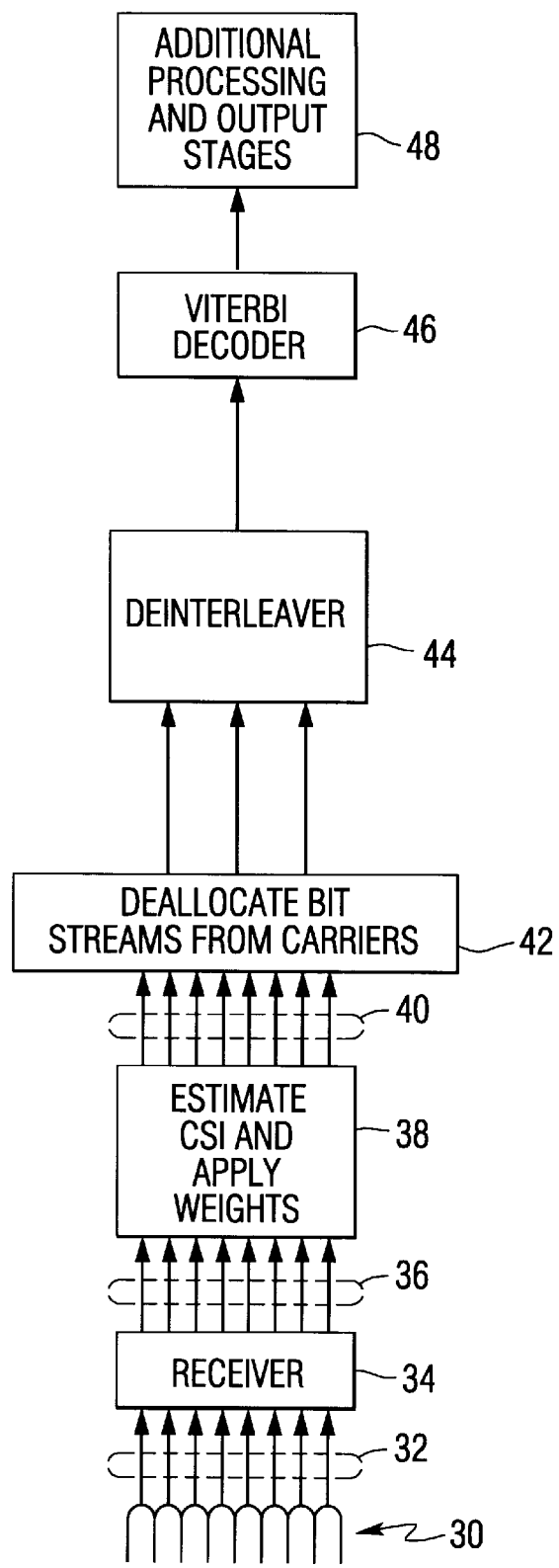
FIG. 2 is a functional block diagram showing the mapping and processing of bits through a digital audio broadcasting receiver which employs the method of this invention.

FIG. 2 is a functional block diagram showing the mapping and processing of bits through a portion of an FM receiver that operates in accordance with the method of the invention. A plurality of OFDM carriers 30 are received and converted to bit streams on lines 32 by receiver circuit 34. Circuit 34 includes a digitizer, carrier synchronization, symbol synchronization, and matched filters all operating in accordance with well known techniques to produce the bit streams on lines 36. Block 38 represents the channel state estimates and weighting processes performed according to FIG. 1 to produce weighted bit streams on lines 40. Block 42 shows that the bit streams are deallocated from the carriers and delivered to a deinterleaver 44. The output of the deinterleaver is multiplexed to a single bit stream and passed to a Viterbi decoder 46 decodes the single bit stream. Soft-decision Viterbi decoding with (near) optimum soft-decision weighting for maximum ratio combining (MRC) for differentially detected QPSK sub-carrier symbols is employed to minimize losses over the channel. The output of the Viterbi decoder is subject to additional signal processing, which is not part of the present invention, and passed to output stages, as illustrated by block 48, to produce the desired output from the receiver.

While the present invention has been described in terms of what are at present believed to be its preferred embodiments, it will be apparent to those skilled in the art that various changes may be made to the embodiments described above without departing from the scope of the invention as set forth in the following claims.

What is claimed is:

1. A method for weighting orthogonal frequency division multiplexed soft symbols, said method comprising the steps of:

receiving a plurality of sub-carriers modulated by digital information;

filtering the sub-carriers to produce complex soft decision outputs;

creating a first sequence of the magnitudes of said complex soft decision outputs;

determining the differences between successive samples in said first sequence;

creating a second sequence of the differences between successive samples in said first sequence;

filtering said first and second sequences to produce third and fourth sequences;

using said third and fourth sequences to determine a plurality of weights; and applying said plurality of weights to said complex soft decision outputs.

2. The method of claim 1, wherein said sub-carriers are modulated using quadrature phase shift keying.

3. The method of claim 1, wherein said first and second sequences are filtered using a second order digital infinite impulse response filter.

4. The method of claim 1, wherein:

said third sequence has a time constant smaller than the reciprocal of the fading bandwidth of plurality of sub-carriers; and said fourth sequence has a time constant larger than the reciprocal of the fading bandwidth of plurality of sub-carriers.

5. The method of claim 1, wherein the step of filtering said first and second sequences further comprises the step of compensating for differences in effective group delay of said first and second sequences to produce third and fourth sequences.

6. The method of claim 1, wherein said plurality of weights are determined using the formula:

$$w_{k,n} = \frac{1}{filtd_{k,n} \cdot \left(1 + \left(\frac{filtd_{k,n}}{filtv_{k,n} - filtd_{k,n}}\right)^4\right)}$$

wherein $w_{k,n}$ represents said plurality of weights, $filtv_{k,n}$ represents said third sequence, $filtd_{k,n}$ represents said fourth sequence, k identifies one of said symbols, and n identifies one of said sub-carriers.

7. The method of claim 6, wherein $filtv_{k,n} > 1.5 \cdot filtd_{k,n}$, then $w_{k,n}$ is set to zero.

8. A radio receiver comprising:

means for receiving a plurality of sub-carriers modulated by digital information;

means for filtering the sub-carriers to produce complex soft decision outputs;

means for creating a first sequence of the magnitudes of said complex soft decision outputs;

means for determining the differences between successive samples in said first sequence;

means for creating a second sequence of the differences between successive samples in said first sequence;

means for filtering said first and second sequences to produce third and fourth sequences;

means for using said third and fourth sequences to determine a plurality of weights; and means for applying said plurality of weights to said complex soft decision outputs.

9. The receiver of claim 8, wherein said sub-carriers are modulated using quadrature phase shift keying.

10. The receiver of claim 8, wherein said first and second sequences are filtered using a second order digital infinite impulse response filter.

11. The receiver of claim 8, wherein:

said third sequence has a time constant smaller than the reciprocal of the fading bandwidth of plurality of sub-carriers; and said fourth sequence has a time constant larger than the reciprocal of the fading bandwidth of plurality of sub-carriers.

12. The receiver of claim 8, wherein the means for filtering said first and second sequences further comprises means for compensating for differences in effective group delay of said first and second sequences to produce third and fourth sequences.

13. The receiver of claim 8, wherein said plurality of weights are determined using the formula:

$$w_{k,n} = \frac{1}{filtd_{k,n} \cdot \left(1 + \left(\frac{filtd_{k,n}}{filtv_{k,n} - filtd_{k,n}}\right)^4\right)}$$

where $w_{k,n}$ represents said plurality of weights, $filtv_{k,n}$ represents said third sequence, $filtd_{k,n}$ represents said fourth sequence, k identifies a symbol in said digital information, and n identifies one of said sub-carriers.

14. The receiver of claim 13, wherein $filtv_{k,n} > 1.5 \cdot filtv_{k,n}$, then $W_{k,n}$ is set to zero.

* * * * *

UNITED STATES PATENT AND TRADEMARK OFFICE
CERTIFICATE OF CORRECTION

PATENT NO. : 6,317,470 B1
DATED : November 13, 2001
INVENTOR(S) : Brian William Kroeger and Denise Maureen Cammarata It is certified that error appears in the above-identified patent and that said Letters Patent is hereby corrected as shown below:

Column 2,
Line 39, "$K^{th}$" should read -- $k^{th}$ --.
Line 49, "$S_k$" should read -- $s_k$ --.

Column 3,
Line 17, "$\hat{a}_k = \sqrt[4]{2 \cdot (E\{|y|^2\})^2 - E\{|y|^4\}}$  (4)"

should read -- $\hat{a}_k = \sqrt[4]{2 \cdot \left(E\{|y|^2\}\right)^2 - E\{|y|^4\}}$  (4) --.

Column 3
Line 25, "σk" should read -- $\sigma_k$ --.

Column 4,
Line 21, "$nt^{th}$" should read -- $n^{th}$ --.
Line 48, "$W_{k,n}$" should read -- $w_{k,n}$ --.

Column 6,
Line 54, "$V_{k,n}$" should read -- $v_{k,n}$ --.
Line 56, "$S_{k,n}$" should read -- $s_{k,n}$ --.
Line 61, "$V_{k,n}$" should read -- $v_{k,n}$ --.
Line 63, "$d_{k,n} = v_{k,n} - vk-1,n$" should read -- $d_{k,n} = v_{k,n} - v_{k,n} - v_{k-1,n}$ --.

Column 7,
Line 5, "$V_{k,n}$" should read -- $v_{k,n}$ --.
Line 25, "$V_{k,n}$" should read -- $v_{k,n}$ --.
Line 53, "filtv$_{n-1}$ <= (1-β) · filtv$_{n-1}$ + β · subv$_n$;
        filtd$_{n-1}$ <= (1-β) · filtd$_{n-1}$ + β · subd$_n$    (25)
            n = 0,1,...N-1" should read
-- filtv$_{N-1}$ <= (1-β · filtv$_{N-1}$ + β · subv$_n$;
   filtd$_{N-1}$ <= (1-β · filtd$_{N-1}$ + β · subd$_n$    (25)
       n = 0,1,... N-1 --.
Line 61, "filtv$_n$ <= (1-β) · filtv$_{n-1}$ + β · subv$_n$;
        filtd$_n$ <= (1-β) · filtd$_{n-1}$ + β · subd$_n$    (26)
            n = N-2, N-3,..." should read
-- filtv$_n$ <= (1-β) · filtv$_{n+1}$ + β · subv$_n$;
   filtd$_n$ <= (1-β) · filtd$_{n+1}$ + β · subd$_n$    (26)
       n = N-2, N-3,...0 --.

UNITED STATES PATENT AND TRADEMARK OFFICE
CERTIFICATE OF CORRECTION

PATENT NO. : 6,317,470 B1
DATED : November 13, 2001
INVENTOR(S) : Brian William Kroeger and Denise Maureen Cammarata It is certified that error appears in the above-identified patent and that said Letters Patent is hereby corrected as shown below:

Column 8,
Line 1, "$filtv_n <=(1-\beta) \cdot filtv_{n-1} + \beta \cdot fltv_n;$
$filtd_n <=(1-\beta) \cdot filtd_{n-1} + \beta \cdot fltd_n$ (27)
$n=N-2, N-3,....$" should read
-- $filtv_n <=(1-\beta) \cdot filtv_{n+1} + \beta \cdot filtv_n;$
$filtd_n <=(1-\beta) \cdot filtd_{n+1} + \beta \cdot fild_n$ (27)
$n = 1,2,...N-1$ --.

Column 10,
Line 63, "...wherein if $filtv_{k,n}> 1.5 \cdot filtv_{k,n}$, then $W_{k,n}$ is set to zero."
should read -- ..., wherein if $filtv_{k,n} > 1.5 \ filtd_{k,n}$, then $w_{k,n}$ is set to zero. --.

Signed and Sealed this

Second Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,317,470 B1
APPLICATION NO. : 09/153636
DATED : November 13, 2001
INVENTOR(S) : Brian William Kroeger and Denise Maureen Cammarata It is certified that error appears in the above-identified patent and that said Letters Patent is hereby corrected as shown below:

Column 2,
Line 39, "$K^{th}$" should read -- $k^{th}$ --.
Line 49, "$S_k$" should read -- $s_k$ --.

Column 3,
Line 17, " $\hat{a}_k = \sqrt[4]{2 \cdot (E\{|y|^2\})^2 - E\{|y|^4\}}$     (4)"

should read -- $\hat{a}_k = \sqrt[4]{2 \cdot \left(E\{|y|^2\}\right)^2 - E\{|y|^4\}}$     (4) --.

Column 3
Line 25, "σk" should read -- $\sigma_k$ --.

Column 4,
Line 21, "$nt^{th}$" should read -- $n^{th}$ --.
Line 48, "$W_{k,n}$" should read -- $w_{k,n}$ --.

Column 6,
Line 54, "$V_{k,n}$" should read -- $v_{k,n}$ --.
Line 56, "$S_{k,n}$" should read -- $s_{k,n}$ --.
Line 61, "$V_{k,n}$" should read -- $v_{k,n}$ --.
Line 63, "$d_{k,n} = v_{k,n} - v_{k-1,n}$" should read -- $d_{k,n} = v_{k,n} - v_{k-1,n}$ --.

Column 7,
Line 5, "$V_{k,n}$" should read -- $v_{k,n}$ --.
Line 25, "$V_{k,n}$" should read -- $v_{k,n}$ --.
Line 53, "filtv$_{n-1}$ <=(1-β) · filtv$_{n-1}$ + β · subv$_n$;
filtd$_{n-1}$ <=(1-β) · filtd$_{n-1}$ +β · subd$_n$     (25)
n = 0,1,...N-1" should read
-- filtv$_{N-1}$ <=(1-β · filtv$_{N-1}$ + β · subv$_n$;
filtd$_{N-1}$ <=(1-β · filtd$_{N-1}$ + β · subd$_n$     (25)
n = 0,1,... N-1 --.
Line 61, "filtv$_n$ <=(1-β) · filtv$_{n-1}$ + β · subv$_n$;
filtd$_n$ <=(1-β) · filtd$_{n-1}$ + β · subd$_n$     (26)
n = N-2, N-3,..." should read
-- filtv$_n$ <=(1-β) · filtv$_{n+1}$ + β · subv$_n$;
filtd$_n$ <=(1-β) · filtd$_{n+1}$ + β · subd$_n$     (26)
n = N-2, N-3,...0 --.

UNITED STATES PATENT AND TRADEMARK OFFICE
CERTIFICATE OF CORRECTION

PATENT NO. : 6,317,470 B1
APPLICATION NO. : 09/153636
DATED : November 13, 2001
INVENTOR(S) : Brian William Kroeger and Denise Maureen Cammarata It is certified that error appears in the above-identified patent and that said Letters Patent is hereby corrected as shown below:

Column 8,
Line 1, should read $$-- \begin{array}{l} filtv_n \Leftarrow (1-\beta) \cdot filtv_{n-1} + \beta \cdot filtv_n; \\ filtd_n \Leftarrow (1-\beta) \cdot filtd_{n-1} + \beta \cdot filtd_n; \\ n = 1,2,\ldots N-1. \end{array} \quad --. \quad (27)$$

Column 10,
Line 63, "...wherein if $filtv_{k,n}$> 1.5 · $filtv_{k,n}$, then $W_{k,n}$ is set to zero."
should read -- ..., wherein if $filtv_{k,n}$ > 1.5 $filtd_{k,n}$, then $w_{k,n}$ is set to zero. --.

This certificate supersedes Certificate of Correction issued November 2, 2004.

Signed and Sealed this

Twenty-second Day of August, 2006

JON W. DUDAS
*Director of the United States Patent and Trademark Office*